(12) United States Patent
Tateishi et al.

(10) Patent No.: US 10,401,503 B2
(45) Date of Patent: Sep. 3, 2019

(54) LOCATION ESTIMATION DEVICE

(71) Applicant: DENSO CORPORATION, Kariya, Aichi-pref. (JP)

(72) Inventors: Kojiro Tateishi, Kariya (JP); Naoki Kawasaki, Nishio (JP); Shunsuke Suzuki, Kariya (JP); Hiroshi Mizuno, Kariya (JP); Kenji Muto, Kariya (JP); Mikio Shimizu, Kariya (JP); Yusuke Tanaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 166 days.

(21) Appl. No.: 15/648,166

(22) Filed: Jul. 12, 2017

(65) Prior Publication Data

US 2018/0017683 A1    Jan. 18, 2018

(30) Foreign Application Priority Data

Jul. 13, 2016  (JP) ................................ 2016-138604

(51) Int. Cl.
| | |
|---|---|
| *G01S 19/48* | (2010.01) |
| *B60G 17/019* | (2006.01) |
| *B60W 40/06* | (2012.01) |
| *G01C 21/00* | (2006.01) |
| *G01C 21/36* | (2006.01) |

(Continued)

(52) U.S. Cl.
CPC ........ *G01S 19/48* (2013.01); *B60G 17/01908* (2013.01); *B60W 40/06* (2013.01); *G01C 21/005* (2013.01); *G01C 21/3602* (2013.01); *G01S 17/023* (2013.01); *G01S 17/936* (2013.01); *G05D 1/0268* (2013.01)

(58) Field of Classification Search
CPC . G01S 19/48; G01S 17/023; B60G 17/01908; B60W 40/06; G01C 21/005; G01C 21/3602
USPC .......................................................... 701/408
See application file for complete search history.

(56) References Cited

U.S. PATENT DOCUMENTS

| | | | |
|---|---|---|---|
| 2015/0210274 A1* | 7/2015 | Clarke .................. | B60W 30/00 382/104 |
| 2015/0234045 A1* | 8/2015 | Rosenblum .......... | G01S 13/931 342/71 |

(Continued)

FOREIGN PATENT DOCUMENTS

| | | |
|---|---|---|
| JP | 2008-157636 | 7/2008 |
| JP | 2008-157636 A | 7/2008 |

*Primary Examiner* — Thomas G Black
*Assistant Examiner* — Wae L Louie
(74) *Attorney, Agent, or Firm* — Knobbe, Martens, Olson & Bear, LLP

(57) ABSTRACT

In a location estimation device, a change detection unit detects a point of change in the width of a roadside structure as a width change point. A width correction unit calculates a width deviation between a first relative location of the roadside structure on a map data segment and a second relative location of the roadside structure obtained based on shape information of the roadside structure in the width direction of a vehicle. The width correction unit corrects, as a function of the width deviation and a positional accuracy of the vehicle in the travelling direction, an estimated location of the vehicle in the width direction when it is determined that there is the point of change in the width of the roadside structure in the travelling direction of the vehicle.

7 Claims, 7 Drawing Sheets

(51) Int. Cl.
G05D 1/02    (2006.01)
G01S 17/02   (2006.01)
G01S 17/93   (2006.01)

(56) References Cited

U.S. PATENT DOCUMENTS

| | | | |
|---|---|---|---|
| 2017/0008521 A1* | 1/2017 | Braunstein | G01C 21/32 |
| 2017/0098131 A1* | 4/2017 | Shashua | G06K 9/00805 |
| 2018/0017683 A1* | 1/2018 | Tateishi | G01S 17/023 |
| 2018/0024562 A1* | 1/2018 | Bellaiche | G01S 19/48 |
| | | | 701/26 |
| 2018/0025235 A1* | 1/2018 | Fridman | G08G 1/096725 |
| | | | 382/103 |
| 2018/0101177 A1* | 4/2018 | Cohen | G05D 1/0246 |
| 2018/0194286 A1* | 7/2018 | Stein | B60W 10/18 |

* cited by examiner

FIG.6A
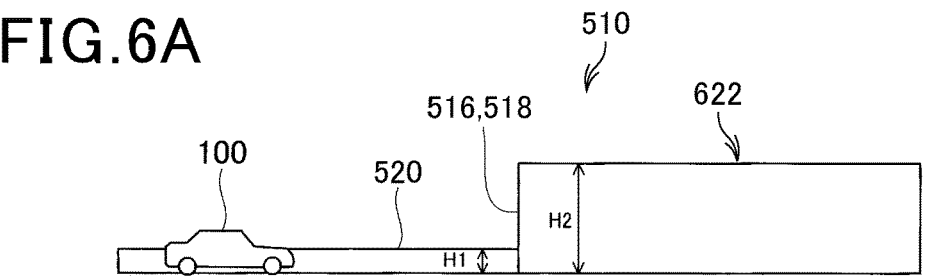
FIG.6B
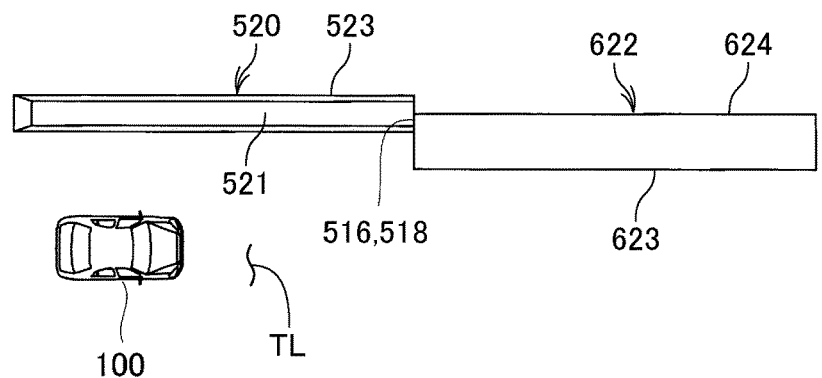
FIG.7
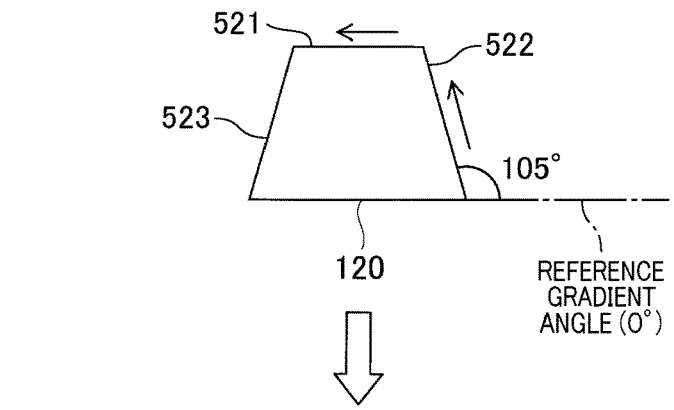
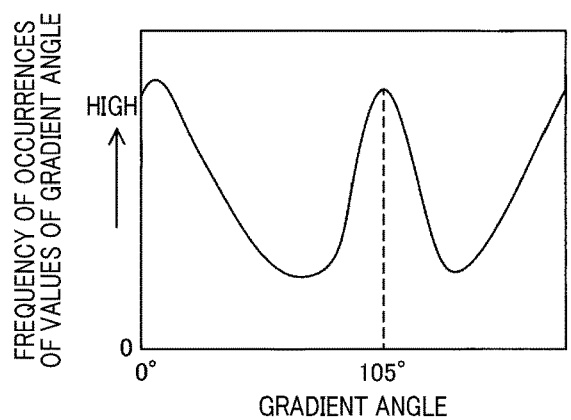

LOCATION ESTIMATION DEVICE

CROSS REFERENCE TO RELATED APPLICATIONS

This application is based on and claims the benefit of priority from Japanese Patent Application 2016-138604 filed on Jul. 13, 2016, the disclosure of which is incorporated in its entirety herein by reference.

TECHNICAL FIELD

The present disclosure relates to a technology for estimating the location of a vehicle.

BACKGROUND

One of known location estimation technologies calculates a first measurement position of a vehicle based on radio positioning signals received from positioning satellites. The technology also calculates a second measurement position of the vehicle using autonomous navigation with a vehicle speed sensor and a gyro sensor. Then, the technology estimates the location of the vehicle based on the first and second measurement positions.

Deterioration of reception of the radio positioning signals, multipath propagation of the radio positioning signals, or other similar factors due to blocking objects that block the radio positioning signals may cause errors in the first measurement position calculated based on the radio positioning signals. In addition, repeatedly updating the second measurement position of the vehicle using autonomous navigation may cause errors in the updated second measurement positions to be accumulated, resulting in the total value of the errors being larger. This may make it difficult to accurately estimate the location of the vehicle based on the first and second measurement positions.

From this viewpoint, Japanese Patent Application Publication No. 2008-157636 discloses a technology, referred to as a published technology; the published technology calculates the distance between a vehicle and a target object, such as a guardrail or a road sign, based on image data of the target object captured by a camera. Then, the published technology estimates the location of the vehicle based on the location of the target object in map data, and the calculated distance between the vehicle and the target object; this location of the vehicle will be referred to as map-based location of the vehicle.

In particular, the published technology corrects the estimated location of the vehicle based on the first and second measurement positions using the map-based location of the vehicle.

On the other hand, controlling a vehicle while the vehicle keeps a travelling lane of a road requires accurate estimation of the location of the vehicle in the width direction of the road.

SUMMARY

Let us consider a case that calculates the distance between a vehicle and a roadside structure on a road in place of a guardrail or a road sign. If the distance of the roadside structure to the centerline of the road is changed at a predetermined point of the roadside structure along the road, the roadside structure is estimated to be comprised of a first roadside-structure part and a second roadside structure part partitioned at the point as the boundary between the first and second roadside-structure parts. This point will be referred to as a width change point.

For example, a roadside structure may include a curb and a wall on a road, which is adjacent to the curb and projects toward the center of the road from the curb. In this case, the distance of the roadside structure to the centerline of the road is changed at the boundary between the curb and the wall as a width change point. That is, the distance from a vehicle travelling on the road to the curb is different from the distance from the vehicle to the wall in the vehicle width direction.

If a vehicle is travelling on the road near the boundary between the curb and the wall, the published technology may erroneously calculate the distance between the vehicle and the curb, and may obtain, from the map data, the location of the curb although the vehicle is located to be closer to the wall, for example at a location where a building or roadside wall protrudes into the road.

This therefore may result in the published technology erroneously estimating the map-based location of the vehicle based on the location of the curb in map data, and the calculated distance between the vehicle and the curb, because the vehicle is located to be closer to the wall. Even if the published technology corrects the location of the vehicle based on the first and second measurement positions using the map-based location of the vehicle, the corrected location of the vehicle in the vehicle width direction based on the first and second measurement positions may have low accuracy.

That is, the published technology may not estimate the location of the vehicle travelling on a road in the vehicle width direction with high accuracy if the distance of the roadside structure to the centerline of the road is changed at a predetermined point of the roadside structure along the road.

In view of the circumstances, a first aspect of the present disclosure seeks to provide location estimation devices, each of which is capable of addressing the problem set forth above.

Specifically, a second aspect of the present disclosure seeks to provide such location estimation devices, each of which is capable of estimating the location of a vehicle on a road in a vehicle width direction with higher accuracy.

According to a first exemplary aspect of the present disclosure, there is provided a location estimation device that includes a location estimation unit configured to estimate a location of a vehicle on a corresponding map data segment in accordance with a first measurement position of the vehicle calculated based on a positioning signal sent from at least one positioning satellite, and a second measurement position of the vehicle calculated using autonomous navigation. The location estimation device includes a map-location obtaining unit configured to obtain a first relative location of a roadside structure relative to the estimated location of the vehicle on the map data segment based on the estimated location of the vehicle on the map data segment, and a location of the roadside structure on the map data segment, the roadside structure being disposed at an edge of a travelling lane of a road on which the vehicle is travelling. The location estimation device includes a second relative location obtaining unit configured to obtain a second relative location of the roadside structure relative to the vehicle based on shape information measured by an in-vehicle sensor. The shape information represents at least a shape of the roadside structure. The location estimation device includes a change detection unit configured to determine, based on at least one of the shape information and comparison between the first relative location and the second relative location, whether there is a point of change in a width of the roadside structure along a travelling direction of the vehicle. The width of the roadside structure is along a width direction of the vehicle. The change detection unit is configured to detect, when it is determined that there is a point of change in the width of the roadside structure along the travelling direction of the vehicle, the point of change in the width of the roadside structure as a width change point. The location estimation device includes a width correction unit configured to calculate a width deviation between the first relative location of the roadside structure and the second relative location of the roadside structure in the width direction of the vehicle. The width correction unit is configured to correct, based on the width deviation, the estimated location of the vehicle in the width direction of the vehicle when it is determined that there is not a point of change in the width of the roadside structure in the travelling direction of the vehicle. The width correction unit is configured to correct, as a function of the width deviation and a positional accuracy of the vehicle in the travelling direction, the estimated location of the vehicle in the width direction of the vehicle when it is determined that there is a point of change in the width of the roadside structure in the travelling direction of the vehicle.

According to a second exemplary aspect of the present disclosure, there is provided a location estimation method includes estimating a location of a vehicle on a corresponding map data segment in accordance with a first measurement position of the vehicle calculated based on a positioning signal sent from at least one positioning satellite, and a second measurement position of the vehicle calculated using autonomous navigation. The location estimation method includes obtaining a first relative location of a roadside structure relative to the estimated location of the vehicle on the map data segment based on the estimated location of the vehicle on the map data segment, and a location of the roadside structure on the map data segment. The roadside structure is disposed at an edge of a travelling lane of a road on which the vehicle is travelling. The location estimation method includes obtaining a second relative location of the roadside structure relative to the vehicle based on shape information measured by an in-vehicle sensor. The shape information represents at least a shape of the roadside structure. The location estimation method includes determining, based on at least one of the shape information and comparison between the first relative location and the second relative location, whether there is a point of change in a width of the roadside structure along a travelling direction of the vehicle. The width of the roadside structure is along a width direction of the vehicle. The location estimation method includes detecting the point of change in the width of the roadside structure as a width change point when it is determined that there is a point of change in the width of the roadside structure along the travelling direction of the vehicle. The location estimation method includes calculating a width deviation between the first relative location of the roadside structure and the second relative location of the roadside structure in the width direction of the vehicle. The location estimation method includes correcting, based on the width deviation, the estimated location of the vehicle in the width direction of the vehicle when it is determined that there is not a point of change in the width of the roadside structure in the travelling direction of the vehicle. The location estimation method includes correcting, as a function of the width deviation and a positional accuracy of the vehicle in the travelling direction, the estimated location of the vehicle in the width direction of the vehicle when it is determined that there is a point of change in the width of the roadside structure in the travelling direction of the vehicle.

The first relative location of the roadside structure relative to the estimated location of the vehicle is kept unchanged independently of the positional accuracy of the vehicle in the travelling direction if there is not a point of change in the width of the roadside structure along the travelling direction of the vehicle. Similarly, the second relative location of the roadside structure relative to the vehicle based on the shape information measured by the in-vehicle sensor is also kept unchanged independently of the position of the vehicle in the travelling direction if there is no point of change in the width of the roadside structure along the travelling direction of the vehicle.

This results in the width deviation between the first relative location of the roadside structure relative to the estimated location of the vehicle and the second relative location of the roadside structure relative to the vehicle being unchanged along the travelling direction of the vehicle.

Accordingly, when it is determined that there is not a point of change in the width of the roadside structure, it is possible to correct, based on the width deviation, the estimated location of the vehicle in the width direction of the vehicle with higher accuracy independently of the positional accuracy of the vehicle in the travelling direction.

In contrast, if there is a point of change in the width of the roadside structure, the higher the positional accuracy of the vehicle in the travelling direction is, the higher the positional accuracy of the point of change in the width of the roadside structure is. This results in the positional accuracy of a first portion of the roadside structure before the point of change and a second portion of the roadside structure after the point of change in the travelling direction being higher. This results in the accuracy of the second relative location of the roadside structure relative to the vehicle being higher.

This therefore results in the accuracy of the width deviation between the first relative location of the roadside structure and the second relative location of the roadside structure in the width direction of the vehicle being higher. This enables the accuracy of correcting, based on the width deviation, the estimated location of the vehicle in the width direction to become higher.

In contrast, the lower the positional accuracy of the vehicle in the travelling direction is, the lower the accuracy of the width deviation between the first relative location of the roadside structure and the second relative location of the roadside structure in the width direction of the vehicle. This results in the accuracy of correcting, based on the width deviation, the estimated location of the vehicle in the width direction to become lower.

From this viewpoint, each of the location estimation device and method is configured to correct, as a function of the width deviation and the positional accuracy of the vehicle in the travelling direction, the estimated location of the vehicle in the width direction of the vehicle when it is determined that there is the point of change in the width of the roadside structure in the travelling direction of the vehicle. This therefore enables the location of the vehicle on the map data segment to be estimated with higher accuracy.

BRIEF DESCRIPTION OF THE DRAWINGS

Other aspects of the present disclosure will become apparent from the following description of embodiments with reference to the accompanying drawings in which:

FIG. 6A is an explanatory side view schematically illustrating a height change point of a roadside structure according to the second embodiment of the present disclosure;

FIG. 6B is an explanatory plan view of the height change point of the roadside structure according to the second embodiment of the present disclosure;

FIG. 7 is an explanatory view schematically illustrating a frequency distribution of the occurrences of values of each of gradient angles of a curb in the travelling direction of the vehicle according to the second embodiment;

DETAILED DESCRIPTION

Figure 1:
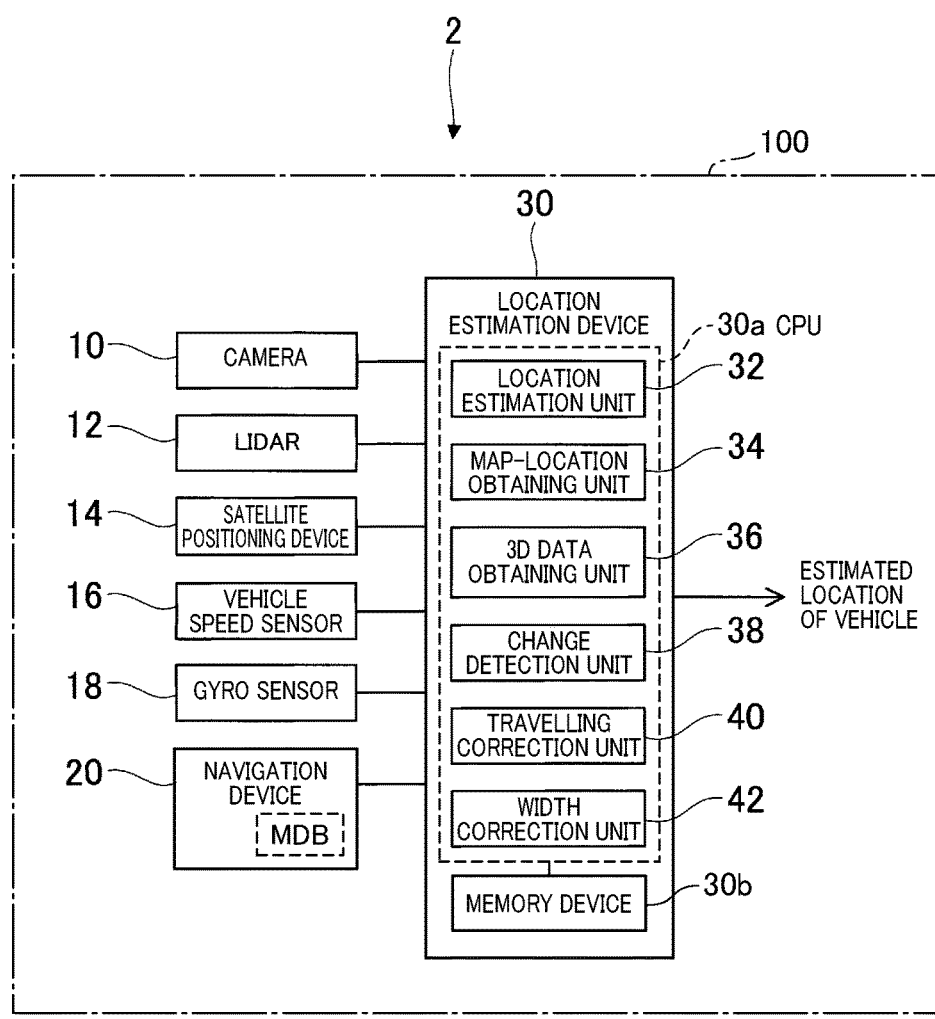
FIG. 1 is a block diagram schematically illustrating a location estimation system installed in a vehicle according to the first embodiment of the present disclosure.

The following describes embodiments of the present disclosure with reference to the accompanying drawings. In the embodiments, like parts between the embodiments, to which like reference characters are assigned, are omitted or simplified to avoid redundant description.

First Embodiment

The following describes an in-vehicle location estimation system 2 installed in a vehicle 100 according to the first embodiment of the present disclosure as illustrated in FIG. 1. The in-vehicle location estimation system 2 includes cameras 10, LIDAR units 12, a satellite positioning device 14, a vehicle speed sensor 16, a gyro sensor 18, a navigation device 20, and a location estimation device 30. Note that LIDAR is an abbreviation of light detection and ranging or laser imaging detection and ranging.

Each of the cameras 10 is comprised of, for example, a monocular camera or a stereo camera. The first embodiment uses front and rear cameras 10 respectively mounted to, for example, the front head and the rear head of the vehicle 100.

The front camera 10 repeatedly captures image data of a predetermined three-dimensional region around the vehicle 100 at least including a front region of the vehicle 100. Then, the front camera 10 repeatedly outputs the image data to the location estimation device 30 as first detection information.

The rear camera 10 repeatedly captures image data of a predetermined three-dimensional region around the vehicle 100 at least including a rear region of the vehicle 100. Then, the camera 10 repeatedly outputs the image data to the location estimation device 30 as the first detection information.

The first embodiment uses front and rear LIDAR units 12 mounted to the respective front head and rear head of the vehicle 100.

The front LIDAR unit 12 emits laser pulses in a predetermined three-dimensional region around the vehicle 100 at least including a front region of the vehicle 100. Then, the front LIDAR unit 12 receives an echo signal based on reflection of a laser pulse emitted from the front LIDAR unit 12 by at least one object located in the three-dimensional region. Then, the front LIDAR unit 12 calculates a distance, from the vehicle 100, to the at least one object based on the time difference between the emitting of the laser pulse and the receiving of the corresponding echo.

Similarly, the rear LIDAR unit 12 emits laser pulses in a predetermined three-dimensional region around the vehicle 100 at least including a rear region of the vehicle 100. Then, the rear LIDAR unit 12 receives an echo signal based on reflection of a laser pulse emitted from the front LIDAR unit 12 by at least one object located in the three-dimensional region. Then, the rear LIDAR unit 12 calculates a distance, from the vehicle 100, to the at least one object based on the time difference between the emitting of the laser pulse and the receiving of the corresponding echo.

The at least one object includes other vehicles, roadside objects, pedestrians, markings on a road surface on which the vehicle 100 is travelling, marking lines, and the like.

Each of the LIDAR units 12 also calculates the orientation, i.e. the angle relative to the front and center direction, of a corresponding at least one object based on the orientations of the received echoes. Each of the LIDAR units 12 outputs calculated distance and angle of corresponding to at least one object to the location estimation device 30 as second detection information.

The satellite positioning device 14 receives positioning signals from positioning satellites, such as global positioning systems (GPS) or global navigation satellite systems (GNESS), to measure the position of the vehicle 100 in longitude and latitude, and outputs the measurement position to the location estimation device 30 as a first measurement position.

The vehicle speed sensor 16 detects the speed of the vehicle 100. The gyro sensor 18 detects the change rates of the respective yaw angle, pitch angle, and roll angle of the vehicle 100.

The navigation device 20 includes a driver-viewable monitor and a map database MDB storing map data segments; the whole of the map data segments covers the area about which the vehicle 100 can travel. The navigation device 20 receives the current location of the vehicle 100 supplied from, for example, the location estimation device 100 and a desired destination input by the driver using a touch panel display or a not-shown microphone.

Then, the navigation device 20 displays, from the map database MDB, the map data segment around the current location of the vehicle 100 on the monitor, and determines suitable routes to the input destination from the current location of the vehicle 100. When the driver selects one of the suitable routes using the touch panel display or the microphone, the navigation device 20 guides the driver to drive the vehicle 100 in accordance with the selected suitable route while continuously displaying the changing current location of the vehicle 100 travelling along the selected suitable route.

Specifically, the map database MDB stores each of the map data segments including 1. Nodes indicative of intersections or other necessary nodal points of a roadway network included in the map data segment
2. Links indicative of roads, i.e. road segments, between the nodes
3. Types and positions of roadside structures located on the roads, which include curbs, guardrails, buildings, and the like The location estimation device 30 includes at least one known microcomputer including a CPU 30a and a memory device 30b. The memory device 30b includes, for example, at least one of semiconductor memories, such as a RAM, a ROM, and a flash memory. These semiconductor memories are, for example, non-transitory storage media.

For example, the CPU 30a can run one or more programs, i.e. program instructions, stored in the memory device 30b, thus implementing various functions of the location estimation device 30 as software operations. In other words, the CPU 30a can run programs stored in the memory device 30b, thus performing one or more methods or routines, which include a location estimation routine, in accordance with the corresponding one or more programs.

The location estimation device 30 includes a location estimation unit 32, a map-location obtaining unit 34, a three-dimensional (3D) data obtaining unit 36, a change detection unit 38, a travelling correction unit 40, and a width correction unit 42. As described above, the CPU 30a of the location estimation device 30 runs a corresponding one or more programs stored in the memory device 30b, thus implementing the functional modules 32, 34, 36, 38, 40, and 42.

At least one of the various functions of the location estimation device 30 can be implemented as a hardware electronic circuit. For example, the various functions of the location estimation device 30 can be implemented by a combination of electronic circuits including digital circuits, which include many logic gates, analog circuits, digital/analog hybrid circuits, or hardware/software hybrid circuits.

Figure 2:
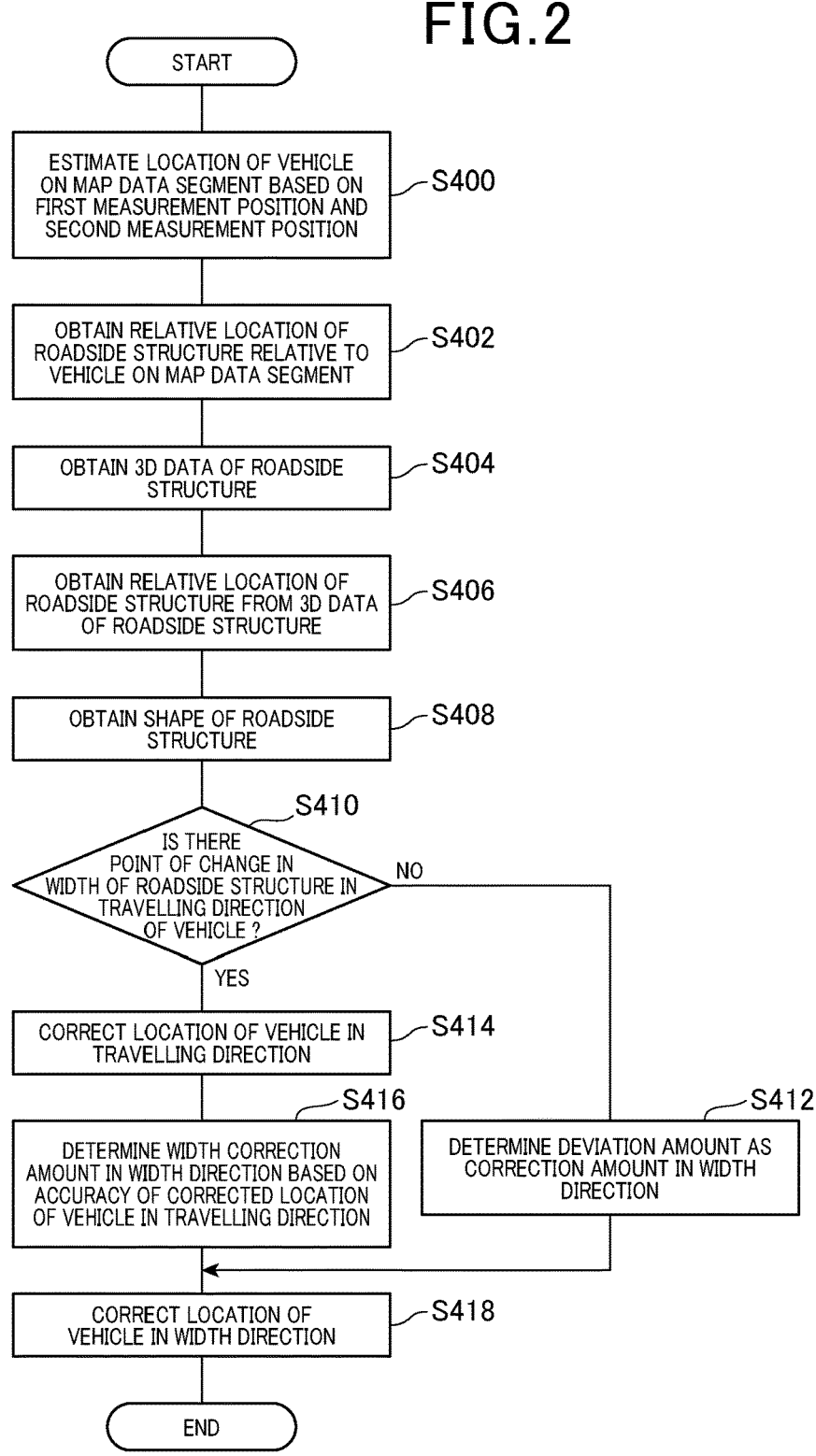
FIG. 2 is a flowchart schematically illustrating a location estimation routine carried out by a location estimation device illustrated in FIG. 1.

The following describes a location estimation routine executed by the location estimation device 30 with reference to the flowchart illustrated in FIG. 2. Specifically, the CPU 30a of the location estimation device 30 executes the location estimation routine at predetermined time intervals while the location estimation device 30 is powered on.

When starting the location estimation routine, the location estimation unit 32 receives, from the satellite positioning device 14, the first measurement position in step S400. The location estimation unit calculates, in step S400, a second measurement position of the vehicle 100 using autonomous navigation based on 1. The speed of the vehicle 100 detected by the vehicle speed sensor 16
2. The change rates of the respective yaw angle, pitch angle, and roll angle of the vehicle 100 measured by the gyro sensor 18.

Then, the location estimation unit 32 estimates, in step S400, the location, i.e. the current location, of the vehicle 100 on the corresponding map data segment stored in the map database MDB in accordance with the first measurement position and the second measurement position of the vehicle 100. That is, the map data segment shows a predetermined area including the current location of the vehicle 100 and its surrounding area around the vehicle 100. Note that the current location of the center of gravity of the vehicle 100 having corresponding latitude and longitude coordinates is represented as, for example, the location, i.e. current location, of the vehicle 100.

Next, in step S402, the map-location obtaining unit 34 obtains the location of the vehicle 100 estimated by the location estimation unit 32 on the map data segment.

In step S402, the map-location obtaining unit 34 also obtains, based on the location of the vehicle 100 and the location of a roadside structure disposed around the location of the vehicle 100 on the map data segment, the relative location of the roadside structure relative to the vehicle 100.

Figure 3:
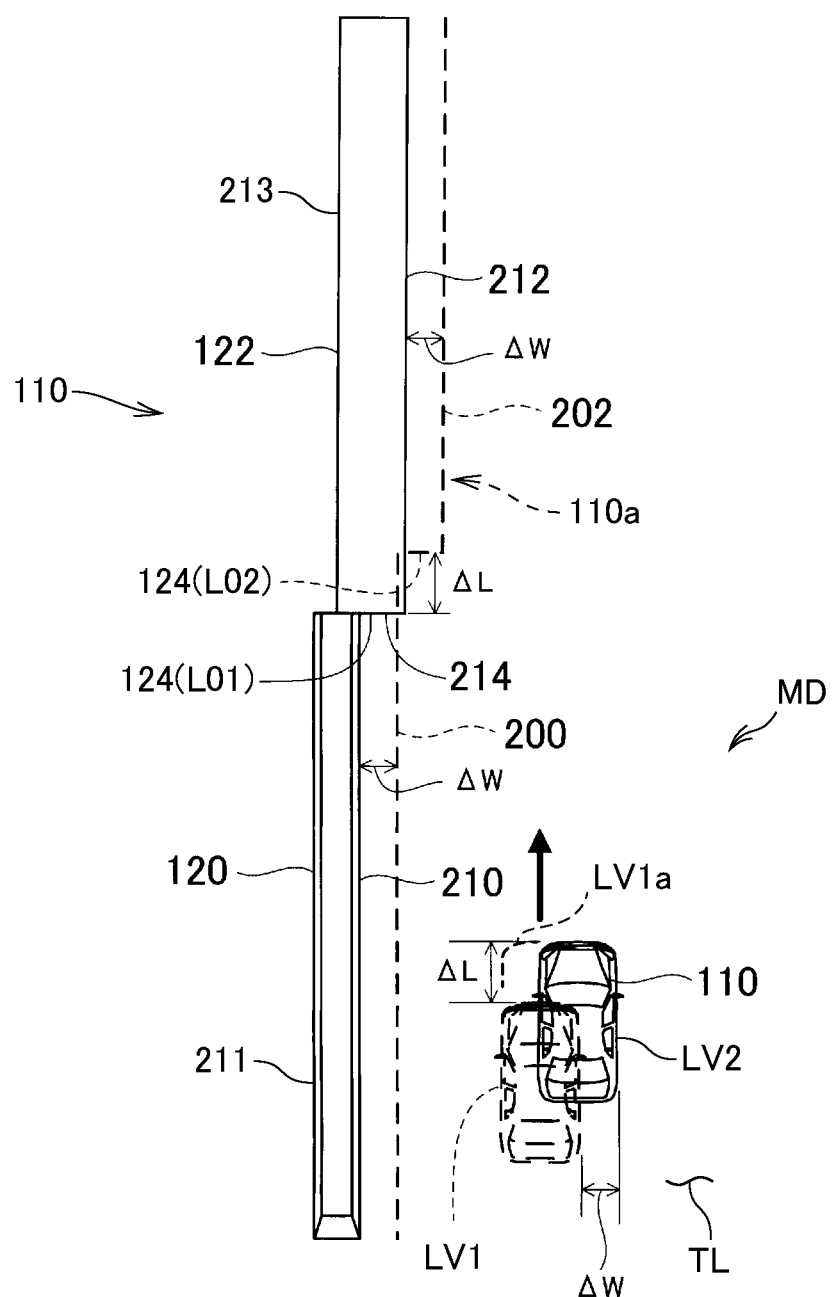
FIG. 3 is an explanatory view schematically illustrating an example of a width change point of a roadside structure.

For example, as illustrated in FIG. 3, the map-location obtaining unit 34 obtains 1. The estimated location LV1 of the vehicle 100 on the map data segment (see reference character MD in FIG. 3)
2. The relative location of a roadside structure 110, which is comprised of a curb 120 and a wall 122, disposed at one edge of the travelling lane (see reference character TL in FIG. 3) of the vehicle 100 on the map data segment MD One edge of the travelling lane TL is closer to the corresponding sidewalk on the map data segment MD than the other edge is.

Specifically, the curb 120 is comprised of, for example, a stone or cement longitudinal parallelepiped ridge having a predetermined height and a predetermined trapezoidal cross section in the width in the vehicle width direction. The curb 120 has opposing longitudinal inclined side surfaces 210 and 211. The location of the longitudinal side surface 210 of the curb 120 relative to the estimated location LV1 of the vehicle 100 on the map data segment MD, which is closer to the travelling lane TL, will be referred to as the relative location of the curb 120 relative to the estimated location LV1 of the vehicle 100.

Additionally, the wall 122 is comprised of, for example, a rectangular-parallelepiped upside structure made of, for example, stone, brick, cement, or the like, having a predetermined height and a predetermined width in the vehicle width direction, which will also be simply referred to as a vehicle width direction. The wall 122 has opposing side surfaces 212 and 213 in the travelling direction. The location of the side surface 212 of the wall 122 on the map data segment MD, which is closer to the travelling lane TL, relative to the estimated location LV1 of the vehicle 100 will be referred to as the relative location of the wall 122 relative to the estimated location LV1 of the vehicle 100.

In particular, FIG. 3 illustrates that the relative location of the curb 120 relative to the estimated location LV1 of the vehicle 100 on the map data segment MD is expressed by dashed line as reference numeral 200.

For example, the relative location 200 of the curb 120 relative to the estimated location LV1 of the vehicle 100 on the map data segment MD represents positional information based on, for example, the distances from the center of gravity of the estimated location LV1 of the vehicle 100 to respective many points on the longitudinal side surface 210 of the curb 120 on the map data segment MD. Similarly, the relative location 202 of the wall 122 relative to the estimated location LV1 of the vehicle 100 represents positional information based on, for example, the distances from the center of gravity of the estimated location LV1 of the vehicle 100 to respective many points on the longitudinal side surface 210 of the curb 120 on the map data segment MD.

The relative location of an object A relative to the vehicle 100 described in the first embodiment has the same meaning as the relative location 210 of the curb 120 or the relative location 202 of the wall 122 relative to the vehicle 100.

Note that roadside structure based on the relative location 200 of the curb 120 and the relative location 212 of the wall 122 on the map data segment MD will be referred to as a roadside structure 110*a* on the map data segment MD.

Following the operation in step S402, the 3D data obtaining unit 36 obtains 3D data of the shape or appearance of the roadside structure 110 based on at least one of 1. The first detection information measured by at least one of the front and rear cameras 10

2. The second detection information measured by at least one of the front and rear LIDAR units 12 in step S404

For example, the 3D data obtaining unit 36 obtains 3D positional information of the roadside structure 110 based on the distances of many points on the appearance of the roadside structure 110 relative to the center of gravity of the vehicle 100 as the 3D data, i.e. 3D measurement data, of the roadside structure 110.

If a stereo camera is used as each of the front and rear cameras 10, the stereo camera is capable of directly capturing three-dimensional image data of the corresponding three-dimensional region as the first detection information. If a monocular camera is used as each of the front and rear cameras 10, the monocular camera is capable of capturing two-dimensional image data of the corresponding three-dimensional region as the first detection information. Then, the 3D data obtaining unit 36 obtains 3D data of the shape or appearance of the roadside structure 110 based on pieces of the two-dimensional image data sequentially captured by the monocular camera.

In S406, the 3D data obtaining unit 36 obtains the relative location 210 of the curb 120 relative to the vehicle 100 based on the 3D data of the curb 120, and the relative location 212 of the wall 122 relative to the vehicle 100 based on the 3D data of the wall 122.

In step S408, the change detection unit 38 obtains, based on the 3D data of the curb 120 and the 3D data of the wall 122, the shape of the roadside structure 110. In step S408, the change detection unit 38 can obtain, based on shape information about the roadside structure 110 stored in the map data segment MD, the shape of the roadside structure 110.

Then, in step S410, the change detection unit 38 determines whether there is a point of change in the width of the roadside structure 110 along the travelling direction of the vehicle 100 in accordance with at least one of 1. The shape of the roadside structure 110

2. The result of comparison between the relative location 210 of the curb 120 and the relative location 212 of the wall 122 of the roadside structure 110

This determination can be made based on whether an amount of change of the shape of the roadside structure 110 in the width direction is equal to or larger than a predetermined amount of change as an example.

That is, the change detection unit 38 determines that there is a point of change in the width of the roadside structure 110 along the travelling direction of the vehicle 100 upon determining that the amount of change in the shape of the roadside structure 110 along the travelling direction is equal to or larger than the predetermined amount of change.

Otherwise, the change detection unit 38 determines that there is not a point of change in the width of the roadside structure 110 along the travelling direction of the vehicle 100 upon determining that the amount of change in the shape of the roadside structure 110 along the travelling direction is smaller than the predetermined amount of change.

Figure 4:
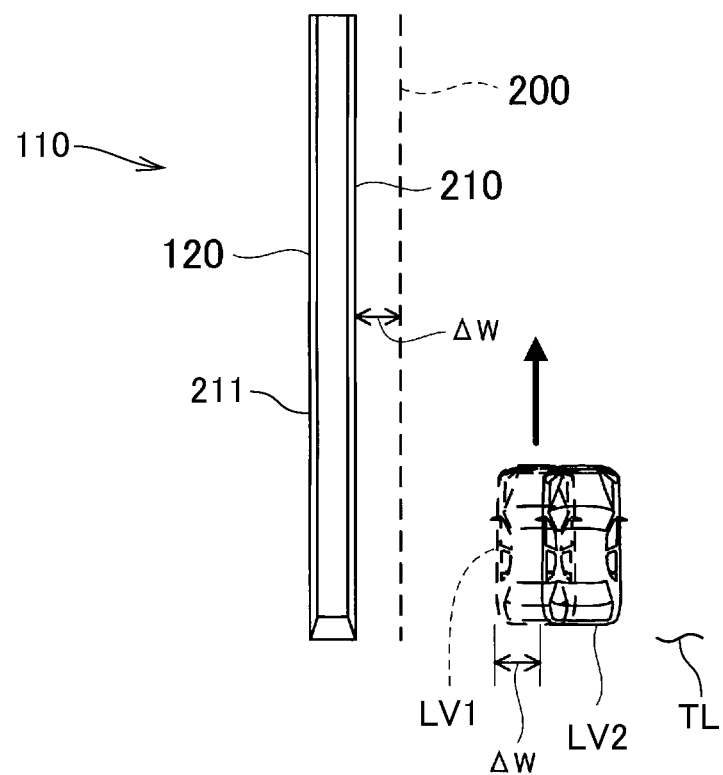
FIG. 4 is an explanatory view schematically illustrating a situation without a point of change in the width direction of the roadside structure.

Referring to FIG. 4, if the roadside structure 110 has only the curb 120, the change detection unit 38 can determine that there is not a point of change in the width of the roadside structure 110 along the travelling direction of the vehicle 100 (NO in step S410). In this case, the relative location 200 of the curb 120 relative to the estimated location LV1 of the vehicle 100 can be kept unchanged independently of the accuracy of the estimated location LV1 of the vehicle 100 in the travelling direction.

Similarly, if the roadside structure 110 has only the wall 122, the change detection unit 38 can determine that there is not a point of change in the width of the roadside structure 110 along the travelling direction of the vehicle 100 (NO in step S410)

In this case, the relative location 210 of the wall 120 relative to the estimated location LV1 of the vehicle 100 can be kept unchanged independently of the accuracy of the estimated location LV1 of the vehicle 100 in the travelling direction.

That is, the location estimation routine proceeds to step S412 when it is determined that there is not a point of change in the width of the roadside structure 110 in the vehicle width direction.

In step S412, the width correction unit 42 calculates a width deviation $\Delta W$ between the relative location 200 of the curb 120 obtained in step S402 and the relative location 210 of the curb 120 obtained in step S406 in the vehicle width direction (see FIG. 3). The width correction unit 42 can calculate the width deviation $\Delta W$ between the relative location 202 of the wall 122 obtained in step S402 and the relative location 212 of the wall 122 obtained in step S406 in the vehicle width direction (see FIG. 3).

Then, the width correction unit 42 determines the calculated width deviation amount $\Delta W$ as a correction amount of the estimated location LV1 of the vehicle 100 in the width direction in step S412. Thereafter, the location estimation routine proceeds to step S418.

Otherwise, as illustrated in FIG. 3, the roadside structure 110 changes in its width from the relative location 210 of the curb 120 to the relative location 212 of the wall 122 at a point 124 in the first embodiment. This results in the roadside structure 110*a* changing in its width from the relative location 200 of the curb 120 to the relative location 202 of the wall 122 at the corresponding point 124.

Thus, the change detection unit 38 determines that there is a point 124 of change in the width of the roadside structure 110 along the travelling direction of the vehicle 100 (YES in step S410).

Then, the location estimation routine proceeds to step S414. The point 124 of change of the roadside structure 110 in the vehicle width direction will be referred to as a width change point 124 as an example of a shape change point of the roadside structure.

If the estimated location LV1 of the vehicle 100 on the map data segment MD obtained by the map-location obtaining unit 34 is shifted relative to the actual location of the vehicle 100 in the travelling direction, the relative location LO2 of the width change point 124 relative to the vehicle 100 on the map data segment MD is different from the relative location LO1 of the width change point 124 relative to the vehicle 100 in the travelling direction as illustrated in FIG. 3, which is obtained based on the 3D data of the roadside structure 110.

In this case, the wall 122, whose relative location relative to the vehicle 100 is detected by the cameras 10 and/or the LIDAR units 12, might be misrecognized as the curb 120. Similarly, the curb 120, whose relative location relative to the vehicle 100 is detected by the cameras 10 and/or the LIDAR units 12, might be misrecognized as the wall 122.

In view of these circumstances, the travelling correction unit 40 according to the first embodiment calculates, in step S414, a travelling deviation ΔL in the travelling direction between the relative location LO2 of the width change point 124 obtained in step S402 and the relative location LO1 of the width change point 124 obtained in step S406. Then, the travelling correction unit 40 corrects, in step S414, the estimated location LV1 of the vehicle 100 on the map data segment MD in the travelling direction to a location LV1a of the vehicle 100 indicated by a two-dot chain line based on the travelling deviation amount ΔL as illustrated in FIG. 3.

If the wall 122 projecting toward the centerline of the travelling lane TL of the road from the curb 120 is located to follow the curb 120 in the travelling direction as illustrated in FIG. 3, the location estimation device 30 can detect the relative location LO1 of the width change point 124 relative to the vehicle 100 in the travelling direction using the cameras 10 and/or the LIDAR units 12 with higher accuracy.

Figure 5:
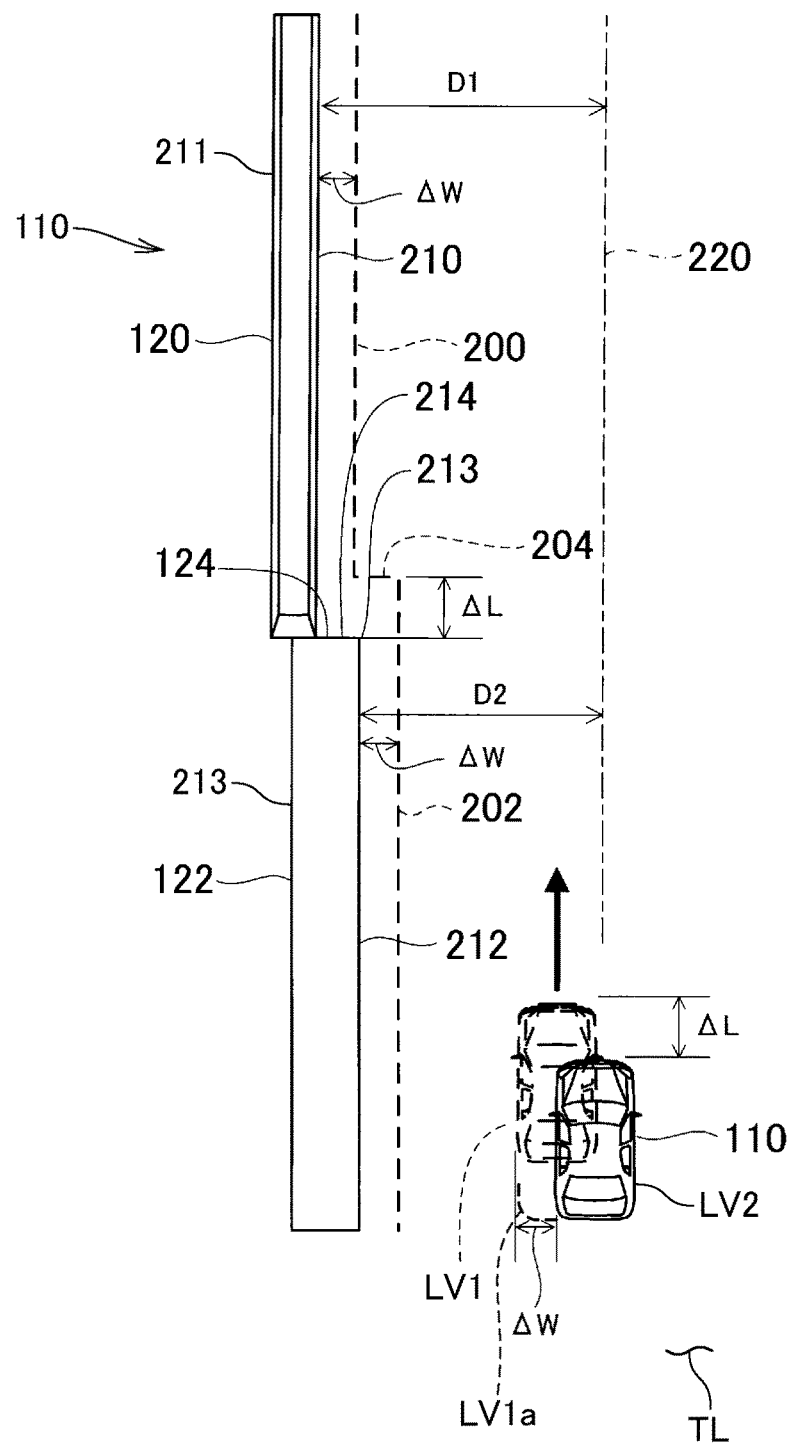
FIG. 5 is an explanatory view schematically illustrating the accuracy of a width change point in the travelling direction of the vehicle.

On the other hand, if the wall 122 projecting toward the travelling lane TL from the curb 120 is located before the curb 120 in the travelling direction as illustrated in FIG. 5, the wall 122 blocks the width change point 124. In this case, the cameras 10 and/or the LIDAR units 12 may not detect where the width change point 124 is actually disposed on the curb 120 blocked by the wall 122.

In FIG. 5, the minimum distance between the bottom edge of the side surface 210 of the curb 120 and a longitudinal center 220 of the travelling lane TL is represented as D1, and the minimum distance between the bottom edge of the side surface 212 of the wall 122 and the longitudinal center 220 of the travelling lane TL is represented as D2.

That is, in step S410, when the equation D1>D2 is satisfied, the location estimation device 30 can determine that the width change point 124 is blocked by the wall 122. Then, in step S414, the travelling correction unit 40 obtains, as the relative location LO1 of the width change point 124 relative to the vehicle 100, the relative location of a first corner 123a of the wall 122 on the side surface 212 relative to the vehicle 100; the first corner 123a is closer to the curb 120 than a second corner 123b of the wall 122 on the side surface 212 is.

In step S414, the travelling correction unit 40 calculates the accuracy AC, i.e. the positional accuracy, of the corrected location LV1a of the vehicle 100 in the travelling direction using following equation (1):

$$AC=D2/D1 \quad (1)$$

The accuracy AC of the corrected location LV1a of the vehicle 100 in the travelling direction corrected in step S414 decreases as the degree of the curb 120 being blocked by the wall 122 rises with an increase in the difference between the distances D1 and D2 in the equation (1). The travelling correction unit 40 sets, to 1, the accuracy AC of the corrected location LV1a of the vehicle 100 in the travelling direction when the wall 122 does not block the curb 120 as illustrated in FIG. 3 in comparison to the accuracy AC calculated by the equation (1).

In step S416, the width correction unit 42 calculates the width deviation ΔW between the relative location 200 of the curb 120 obtained in step S402 and the relative location 210 of the curb 120 obtained in step S406 (see FIGS. 3 and 5). The width correction unit 42 can calculate the width deviation ΔW between the relative location 202 of the wall 122 obtained in step S402 and the relative location 212 of the wall 122 obtained in step S406 (see FIGS. 3 and 5).

In step S416, the width correction unit 42 multiplies the width deviation amount ΔW by the accuracy AC of the corrected location LV1a of the vehicle 100 in the travelling direction calculated in step S414, thus determining a width correction amount for the estimated location LV1, i.e. the corrected location LV1a, of the vehicle 100 in the width direction on the map data segment MD.

Accordingly, the width correction unit 42 determines the width correction amount of the estimated location LV1, i.e. the corrected location LV1a, of the vehicle 100 in the width direction on the map data segment MD while reflecting the accuracy AC of the corrected location LV1a of the vehicle 100 in the travelling direction on the corrected location LV1a of the vehicle 100.

Following the operation in step S416, the width correction unit 42 corrects, based on the width correction amount determined in step S412 or S416, the corrected location LV1a of the vehicle 100 in the width direction on the map data segment MD estimated by the location estimation unit 32. This finally obtains a corrected location LV2 of the vehicle 100 in both the travelling direction and the width direction in step S418. The corrected location LV2 of the vehicle 100 after the location estimation routine set forth above is completed is illustrated in FIG. 3.

The corrected location LV2 of the vehicle 100 is output from the location estimation device 30 to, for example, a control unit installed in the vehicle 100. The control unit is configured to, for example, calculate the deviation of the corrected location LV2 of the vehicle 100 in the width direction from a target location in the width direction while performing lane keep assist to keep the vehicle 100 in the current travelling lane TL.

The in-vehicle location estimation system 2 according to the first embodiment set forth above achieves the following advantageous effects.

If there is a point 124 of change in the width of the roadside structure 110 in the width direction, the location estimation device 30 corrects the location LV1 of the vehicle 100 estimated by the location estimation unit 32 in the travelling direction in accordance with the travelling deviation ΔL in the travelling direction between 1. The relative location LO2 of the width change point 124 obtained by the map-location obtaining unit 34
2. The relative location LO1 of the width change point 124 obtained by the 3D data of the roadside structure 110 in step S406

Then, the location estimation device 30 additionally corrects, based on the accuracy AC of the corrected location LV1a of the vehicle 100 in the travelling direction, the corrected location LV1a of the vehicle 100 in the width direction. This finally obtains the corrected location LV2 of the vehicle 100 in both the travelling direction and the width direction as compared with the estimated location LV1 of the vehicle 100.

This therefore enables the location of the vehicle 100 in the width direction to be estimated with higher accuracy.

The location estimation device 30 is capable of correcting the location of the vehicle 100 in the width direction with higher accuracy in accordance with the width change point 124 between the curb 120 and the wall 122 successively arranged at a roadside of the travelling lane TL in the travelling direction even if the wall 122 is changed in width from the curb 120 at the width change point 124.

According to the first embodiment described above, the cameras 10 and the LIDAR units 12 correspond to, for example, in-vehicle sensors for detecting a roadside structure. The vehicle speed sensor 16 and the gyro sensor 18 correspond to, for example, sensors used for autonomous navigation. The curb 120 and the wall 122 correspond to, for example, a roadside structure. The width change point 124 corresponds to, for example, a shape change point.

In addition, the operation in step S400 corresponds to, for example, an operation performed by a location estimation unit. The operation in step S402 corresponds to, for example, an operation performed by a map location obtaining unit. The operations in steps S404 and S406 correspond to, for example, an operation performed by a sensor location obtaining unit. The operations in steps S408 and S410 correspond to, for example, an operation performed by a change detection unit. The operations in steps S412, S416, and S418 correspond to, for example, an operation performed by a width correction unit. The operation in step S414 corresponds to, for example, an operation performed by a travelling correction unit.

Second Embodiment

The following describes an in-vehicle location estimation system according to the second embodiment of the present disclosure with reference to FIGS. 6A to 8. The in-vehicle location estimation system according to the second embodiment differs from the in-vehicle location estimation system 2 in the following points. So, the following mainly describes the different points of the in-vehicle location estimation system according to the second embodiment from the in-vehicle location estimation system 2, and omits or simplifies descriptions of like parts between the first and second embodiments, to which identical or like reference characters are assigned, thus eliminating redundant description.

The location estimation device 30 according to the second embodiment is different from the first embodiment in that the location estimation device 30 additionally detects a height change point and a gradient change point described below as shape change points of a roadside structure 510.

The roadside structure 510 is comprised of a curb 520 and a wall 622, and is disposed at the edge of the travelling lane TL of the vehicle 100 closer to the corresponding sidewalk on the map data segment MD.

The curb 120 is comprised of, for example, a stone or cement longitudinal parallelepiped ridge having a predetermined height H1 and a predetermined trapezoidal cross section in the vehicle width direction. That is, the curb 520 has a top surface 521, and opposing longitudinal inclined side surfaces 522 and 523 along the travelling direction of the vehicle 100; the inclined side surface 522 is closer to the travelling lane TL than the inclined surface 523 is.

The top surface 521 of the curb 520 has a predetermined width-directional gradient, i.e. a predetermined gradient angle $\alpha$ in the vehicle width direction with respect to a reference gradient direction, which has zero degrees and is in parallel to the road surface. Moreover, the inclined side surface 521 of the curb 520 has a predetermined gradient, i.e. a predetermined gradient angle $\beta$, in the vehicle width direction with respect to the reference gradient direction.

The wall 622 is comprised of, for example, a rectangular-parallelepiped standing structure made of, for example, stone, brick, cement, or the like, having a predetermined height H2 and a predetermined rectangular triangular cross section in the vehicle width direction. The height H2 of the wall 622 is higher than the height H1 of the curb 120.

The wall 622 has opposing side surfaces 623 and 624 in the travelling direction. The side surface 624 of the wall 622 is perpendicular to the reference gradient direction. The side surface 623 of the wall 622 has a predetermined gradient, i.e. a predetermined gradient angle $\gamma$, in the vehicle width direction with respect to the reference gradient direction; the gradient angle $\gamma$ is clearly distinguishable from the gradient angles $\alpha$ and $\beta$.

The gradient angles $\alpha$, $\beta$, and $\gamma$ have designed angles of 0°, 105°, and 115° with respect to the reference gradient direction of 0°.

The change detection unit 38 according to the second embodiment is configured to detect, as a shape change point where the roadside structure 510 changes in shape, a height change point 516 at which the height of the roadside structure 510 changes, such as a boundary between the curb 520 and the wall 122 as illustrated in FIG. 6.

For example, in step S410, the change detection unit 38 obtains, based on the 3D data of the curb 520 and the 3D data of the wall 122, the shape of the roadside structure 110.

Then, the change detection unit 38 determines, based on the shape of the roadside structure 510, whether there is a point of change in the height of the at least one roadside structure 510 in the travelling direction of the vehicle 100. That is, as illustrated in FIG. 6, the change detection unit 38 detects the change point 516 at which the height of the roadside structure 510 changes from the height H1 to the height H2 along the travelling direction of the vehicle 100.

In addition, the change detection unit 38 samples, based on the 3D data of the curb 520 and the 3D data of the wall 122, 1. Values of the gradient angle $\alpha$ of the top surface 521 of the curb 520 along the travelling direction of the vehicle 100 at predetermined intervals 2. Values of the gradient angle $\beta$ of the inclined side surface 521 of the curb 520 along the travelling direction of the vehicle 100 at the predetermined intervals 3. Values of the gradient angle $\gamma$ of the side surface 212 of the wall 122 along the travelling direction of the vehicle 100 at the predetermined intervals Then, the change detection unit 38 obtains, based on the sampled values of the gradient angles $\alpha$ and $\beta$ of the curb 520, the frequency distribution of the occurrences of values of the gradient angles $\alpha$ and $\beta$ of the curb 520. Additionally, the change detection unit 38 obtains, based on the sampled values of the gradient angle $\gamma$ of the wall 122, the frequency distribution of the occurrences of values of the gradient angle $\gamma$ of the wall 122.

For example, FIG. 7 illustrates that the frequency distribution of the occurrences of values of each of the gradient angles $\alpha$ and $\beta$ of the curb 520 along the travelling direction of the vehicle 100.

Because the gradient angles $\alpha$ and $\beta$ have the designed angles of 0° and 105°, respectively, the frequency distribution illustrated in FIG. 7 has a first peak at the gradient angle $\alpha$ of 0° and a second peak at the gradient angle $\beta$ of 105°. Note that, because the side surface 213 of the curb 520 cannot be detected by the cameras 10 and LIDAR units 12, the gradient angle of the side surface 213 also cannot be detected by the change detection unit 38.

Figure 8:
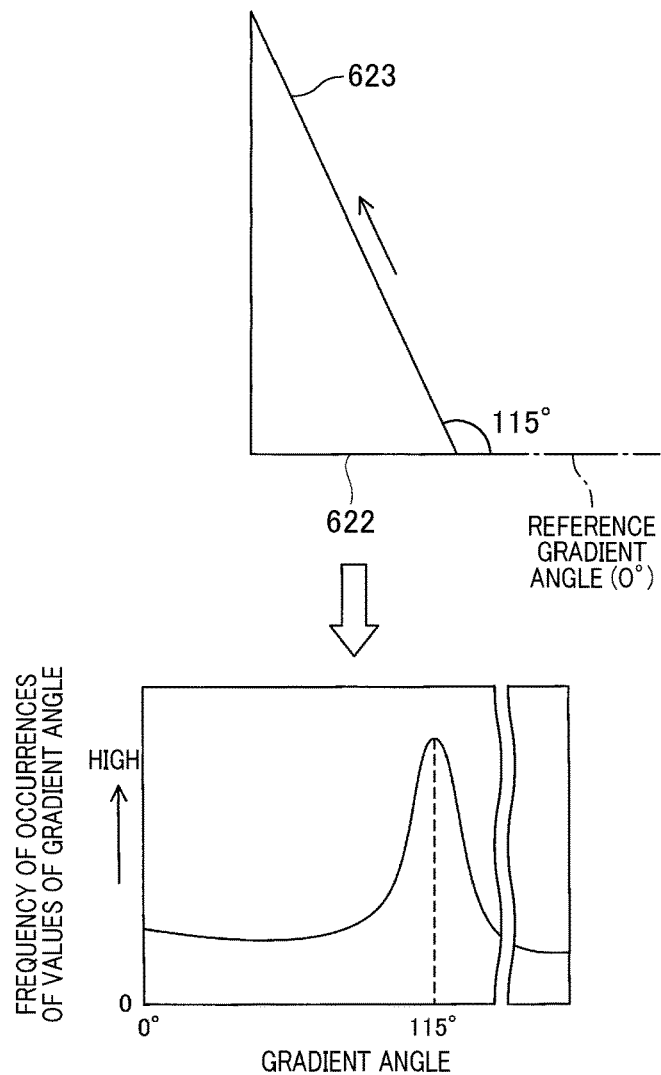
FIG. 8 is an explanatory view schematically illustrating a frequency distribution of the occurrences of values of a gradient angle of a wall according to the second embodiment.

In addition, for example, FIG. 8 illustrates the frequency distribution of the occurrences of values of the gradient angle $\gamma$ of the wall 622 along the travelling direction of the vehicle 100.

Because the gradient angle $\gamma$ has the designed angle of 115°, the frequency distribution illustrated in FIG. 8 has a single peak at 115° of the gradient angle $\gamma$.

Note that, in FIG. 7, the number of the occurrences of values of each of the gradient angles $\alpha$ and $\beta$ of the curb 520 is set to be a value other than zero, because noise affects the 3D data of the curb 520. Similarly, note that, in FIG. 8, the number of the occurrences of values of the gradient angle $\gamma$ of the wall 622 is set to be a value other than zero, because noise affects the 3D data of the wall 622.

Figure 9:
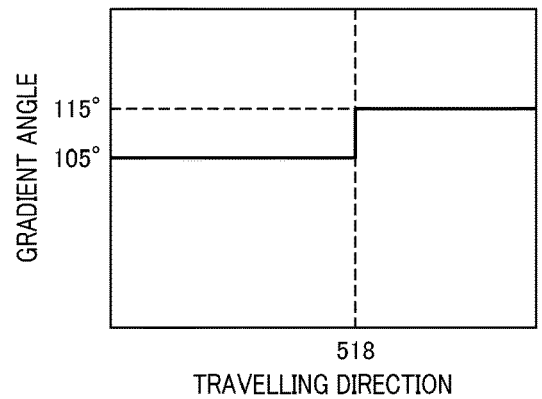
FIG. 9 is a graph schematically illustrating that how the gradient angle of a side portion, which faces a travelling lane of the vehicle, of the roadside structure with respect to a predetermined reference gradient direction, changes along the travelling direction of the vehicle.

FIG. 9 schematically illustrates that the gradient angle β of the inclined side surface 521 of the curb 520 is changed to the gradient angle γ of the side surface 212 of the wall 122 at a gradient change point 518 along the travelling direction of the vehicle 100.

Specifically, in step S410, the change detection unit 38 determines, based on the shape of the roadside structure 510, whether there is a point of change in the gradient of the at least one roadside structure 510 along the travelling direction of the vehicle 100. That is, as illustrated in FIG. 9, the change detection unit 38 detects the gradient change point 518 at which the gradient of the roadside structure 510 changes from the gradient angle β of 105° with respect to the reference gradient direction to the gradient angle γ of 115° with respect to the reference gradient direction along the travelling direction of the vehicle 100.

The travelling correction unit 40 calculates, in step S414, a travelling deviation ΔL in the travelling direction between the relative location of the height change point 216 or the gradient change point 218 obtained by the map-location obtaining unit 34 and the relative location of the height change point 216 or the gradient change point 218 obtained by the 3D data obtaining unit 36. Then, the travelling correction unit 40 corrects, in step S414, the estimated location LV1 of the vehicle 100 on the map data segment MD in the travelling direction to a location LV1a of the vehicle 100 in the same approach as that described in the first embodiment.

The in-vehicle location estimation system according to the second embodiment set forth above achieves the following advantageous effects in addition to the above advantageous effects achieved in the first embodiment.

Even if it is difficult to detect the boundary between the curb 520 and the wall 622 as a width change point due to, for example, when there is an amount of change in shape of the roadside structure 510 in the width direction, the location estimation device 30 according to the second embodiment is configured to 1. Determine, based on the shape of the roadside structure 510, whether there is a point of change in the height or gradient of the at least one roadside structure 510 along the travelling direction of the vehicle 100

2. Calculate a travelling deviation ΔL in the travelling direction between the relative location of the height change point 216 or the gradient change point 218 obtained by the map-location obtaining unit 34 and the relative location of the height change point 216 or the gradient change point 218 obtained by the 3D data obtaining unit 36

3. Correct the estimated location of the vehicle 100 in the travelling direction based on the travelling deviation ΔL.

The travelling correction unit 40 according to each embodiment calculates the accuracy AC of the corrected location LV1a of the vehicle 100 in the travelling direction in accordance with the degree of the curb 120 or 520 being blocked by the wall 122 or 622, which is disposed before the curb 120 or 520 in the travelling direction. The present disclosure is however not limited to each of the first and second embodiments. Specifically, the travelling correction unit 40 can be configured to decrease the accuracy AC of the corrected location LV1a of the vehicle 100 in the travelling direction corrected in step S414 with an increase of the period to update the second measurement position of the vehicle 100 using autonomous navigation over time.

Millimeter-wave radars can be used in place of the LIDAR units 12 as in-vehicle sensors for detecting a roadside structure.

The location estimation device 30 according to the second embodiment is configured to detect the height change point 516 or the gradient change point 518 as the boundary between the curb 520 and the wall 522. The present disclosure is however not limited to this configuration. Specifically, the location estimation device 30 can be configured to detect a point of change in the height of a roadside structure along the travelling direction of the vehicle 100. Similarly, the location estimation device 30 can be configured to detect a point of change in the gradient of a side surface, which faces the travelling lane TL, of a roadside structure along the travelling direction of the vehicle 100.

The functions of one element in each of the first and second embodiments can be distributed as plural elements, and the functions that plural elements have can be combined into one element. At least part of the structure of each of the first and second embodiments can be replaced with a known structure having the same function as the at least part of the structure of the corresponding embodiment. A part of the structure of each of the first and second embodiments can be eliminated. At least part of the structure of each of the first and second embodiments can be added to or replaced with the structures of other embodiments. All aspects included in the technological ideas specified by the language employed by the claims constitute embodiments of the present invention.

The present invention can be implemented by various embodiments in addition to the location estimation device 30; the various embodiments include location estimation systems each including one of the above location estimation devices, programs for serving a computer as each of the location estimation devices, storage media storing the programs, and load estimation methods.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A location estimation device comprising:
    a location estimation unit configured to estimate a location of a vehicle on a corresponding map data segment in accordance with:
        a first measurement position of the vehicle calculated based on a positioning signal sent from at least one positioning satellite; and
        a second measurement position of the vehicle calculated using autonomous navigation;
    a map-location obtaining unit configured to obtain a first relative location of a roadside structure relative to the estimated location of the vehicle on the map data segment based on:
        the estimated location of the vehicle on the map data segment, and a location of the roadside structure on the map data segment, the roadside structure being disposed at an edge of a travelling lane of a road on which the vehicle is travelling;

a second relative location obtaining unit configured to obtain a second relative location of the roadside structure relative to the vehicle based on shape information measured by an in-vehicle sensor, the shape information representing at least a shape of the roadside structure;

a change detection unit configured to:
  determine, based on at least one of the shape information and comparison between the first relative location and the second relative location, whether there is a point of change in a width of the roadside structure along a travelling direction of the vehicle, the width of the roadside structure being along a width direction of the vehicle; and
  detect, based on determining that there is a point of change in the width of the roadside structure along the travelling direction of the vehicle, the point of change in the width of the roadside structure as a width change point; and a width correction unit configured to:
  calculate a width deviation between the first relative location of the roadside structure and the second relative location of the roadside structure in the width direction of the vehicle;
  correct, based on the width deviation, the estimated location of the vehicle in the width direction of the vehicle based on determining that there is not a point of change in the width of the roadside structure in the travelling direction of the vehicle; and
  correct, as a function of the width deviation and a positional accuracy of the vehicle in the travelling direction, the estimated location of the vehicle in the width direction of the vehicle based on determining that there is the point of change in the width of the roadside structure in the travelling direction of the vehicle.

2. The location estimation device according to claim 1, wherein the change detection unit is configured to:
  determine whether an amount of change in the width of the roadside structure at the point of change is equal to or greater than a predetermined amount; and
  detect the point of change in the width of the roadside structure as the width change point based on determining that the amount of change in the width of the roadside structure at the point of change is equal to or greater than the predetermined amount.

3. The location estimation device according to claim 1, further comprising:
  a travelling correction unit configured to:
    calculate a travelling deviation between the first relative location of the roadside structure and the second relative location of the roadside structure in the travelling direction of the vehicle; and
    correct, based on the travelling deviation, the estimated location of the vehicle in the travelling direction of the vehicle to obtain a corrected location of the vehicle in the travelling direction,
  wherein the width correction unit is configured to:
    obtain, as the positional accuracy of the vehicle in the travelling direction, an accuracy of the corrected location of the vehicle in the travelling direction; and
    correct, as a function of the width deviation and the accuracy of the corrected location of the vehicle in the travelling direction, the estimated location of the vehicle in the width direction of the vehicle based on determining that there is the point of change in the width of the roadside structure in the travelling direction of the vehicle.

4. The location estimation device according to claim 3, wherein:
  the change detection unit is configured to:
    determine, based on at least one of the shape information of the roadside structure and shape information about the roadside structure stored in the map data segment, whether there is a point of change in a height of the roadside structure along the travelling direction of the vehicle; and
    detect, based on determining that there is a point of change in the height of the roadside structure along the travelling direction of the vehicle, the point of change in the height of the roadside structure as a height change point; and
  the travelling correction unit configured to:
    calculate the travelling deviation between the first relative location of the roadside structure and the second relative location of the roadside structure in the travelling direction of the vehicle based on the change detection unit detecting the height change point; and
    correct, based on the travelling deviation, the estimated location of the vehicle in the travelling direction of the vehicle to obtain the corrected location of the vehicle in the travelling direction.

5. The location estimation device according to claim 3, wherein:
  the change detection unit is configured to:
    determine, based on at least one of the shape information of the roadside structure and shape information about the roadside structure stored in the map data segment, whether there is a point of change in a width-directional gradient of the roadside structure along the travelling direction of the vehicle; and
    detect, based on determining that there is a point of change in the width-directional gradient of the roadside structure along the travelling direction of the vehicle, the point of change in the width-directional gradient direction of the roadside structure as a gradient change point; and
  the travelling correction unit configured to:
    calculate the travelling deviation between the first relative location of the roadside structure and the third relative location of the roadside structure in the travelling direction of the vehicle based on the change detection unit detecting the width-directional gradient change point; and
    correct, based on the travelling deviation, the estimated location of the vehicle in the travelling direction of the vehicle to obtain the corrected location of the vehicle in the travelling direction.

6. The location estimation device according to claim 3, wherein:
  the roadside structure comprises a first roadside object and a second roadside object following the first roadside object in the travelling direction of the vehicle, the width change point corresponding to a boundary between the first roadside object and the second roadside object in the travelling direction of the vehicle, the first roadside object blocking a part of the second roadside object; and
  the travelling correction unit is configured to:

obtain a degree of the second roadside object being blocked by the first roadside object; and determine the accuracy of the corrected location of the vehicle in the travelling direction in accordance with the degree of the second roadside being blocked by the first roadside object.

7. A location estimation method comprising:

estimating a location of a vehicle on a corresponding map data segment in accordance with:
- a first measurement position of the vehicle calculated based on a positioning signal sent from at least one positioning satellite; and
- a second measurement position of the vehicle calculated using autonomous navigation;

obtaining a first relative location of a roadside structure relative to the estimated location of the vehicle on the map data segment based on:
- the estimated location of the vehicle on the map data segment, and
- a location of the roadside structure on the map data segment, the roadside structure being disposed at an edge of a travelling lane of a road on which the vehicle is travelling;

obtaining a second relative location of the roadside structure relative to the vehicle based on shape information measured by an in-vehicle sensor, the shape information representing at least a shape of the roadside structure;

determining, based on at least one of the shape information and comparison between the first relative location and the second relative location, whether there is a point of change in a width of the roadside structure along a travelling direction of the vehicle, the width of the roadside structure being along a width direction of the vehicle;

detecting, based on determining that there is a point of change in the width of the roadside structure along the travelling direction of the vehicle, the point of change in the width of the roadside structure as a width change point;

calculating a width deviation between the first relative location of the roadside structure and the second relative location of the roadside structure in the width direction of the vehicle;

correcting, based on the width deviation, the estimated location of the vehicle in the width direction of the vehicle based on determining that there is not a point of change in the width of the roadside structure in the travelling direction of the vehicle; and correcting, as a function of the width deviation and a positional accuracy of the vehicle in the travelling direction, the estimated location of the vehicle in the width direction of the vehicle based on determining that there is the point of change in the width of the roadside structure in the travelling direction of the vehicle.

* * * * *